S. KERN.
Compasses.
No. 4,675.  Patented July 31, 1846.
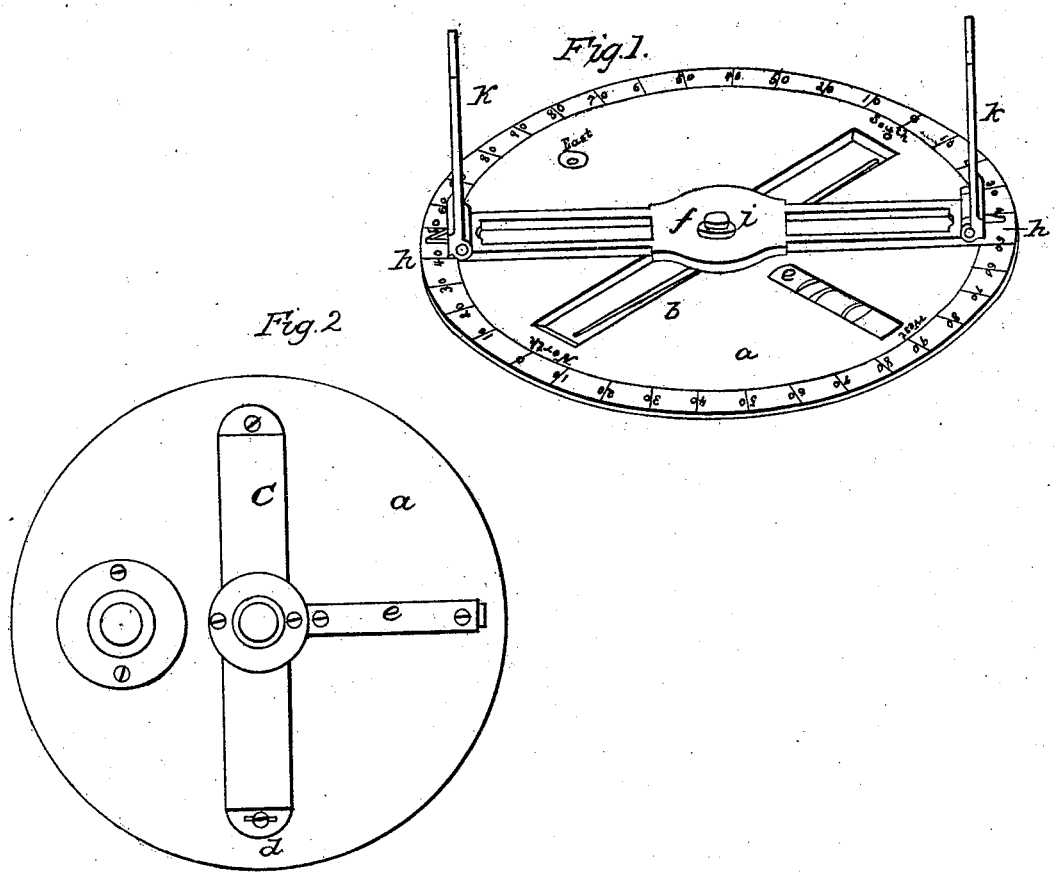

UNITED STATES PATENT OFFICE.

SAMUEL KERN, OF NEAR STRASBURG, VIRGINIA.

SURVEYOR'S COMPASS.

Specification of Letters Patent No. 4,675, dated July 31, 1846.

*To all whom it may concern:*

Be it known that I, SAMUEL KERN, of near Strasburg, in the county of Shenandoah and State of Virginia, have invented new and useful Improvements in Surveyors' Compasses, and that the following is a full, clear, and exact description of the principle or character thereof, which distinguishes them from all other things before known, and of the manner of making, constructing, and using the same, reference being had to the accompanying drawings, making part of this specification, in which—

Figure 1 is a perspective view, and Fig. 2, a plan of the underside of the instrument.

The same letters indicate like parts in all the figures.

The surveyor's compass has heretofore been an expensive instrument and one difficult of adjustment and use, but my construction and arrangement of the parts thereof renders it at once cheap and efficient, enabling one to use it as a compass for running lines, or for leveling, as may be required.

The construction is as follows: There is a circular plate or dial (*a*) of metal, wood, or other proper material, on which an index hereafter described traverses; the circle is divided into four parts of ninety degrees each in the usual way of quadrants, an oblong opening (*b*) is formed running north and south which is covered with glass, and on the underside of the plate beneath the glass there is an oblong box (*c*) in which a common compass needle is suspended. The box is of ordinary construction but it is so attached to the dial plate (*a*) as to be adjustable at the south pole thereof. The screw (*d*) (or other fastening) which attaches it to the plate passes through an oblong hole for that purpose, as shown in Fig. 2. On the west side of the dial plate perpendicular to the compass box a bevel (*e*) is let in flush with the face of the plate. Above the dial there is a flat bar (*f*) on the end of which a pointer or index (*h*) is constructed as shown in Fig. 1; this bar is attached by a screw (*i*) to the center of the dial around which it revolves; on each side of the center this bar has a long mortise made as clearly shown in the drawing, and on the ends are upright sights (*k*) of the usual form used in surveyors' compasses, but jointed so that they can be laid down flat on to the bar for conveyance. When the compass thus constructed is leveled, a line can be run correctly in any direction, and by the adjustment at the south pole of the compass box the observations are capable of correction by reversing the sights—an advantage this instrument possesses over those ordinarily used. By turning the dial into a vertical position, the altitude of an object may be taken.

Having thus fully described my improvement, I wish it to be understood that I do not claim as new the dial plate, the compass needle, or the sights, as they have long been known and used, but in a different combination.

What I do claim as my invention and for which I desire Letters Patent is—

The combination of the dial plate, compass box, and sights in the manner set forth, the compass being placed under the surface of the dial and the bar on which the sights are placed above it so that it can have an entire sweep around the circle tangentially, in the manner and for the purpose described.

SAMUEL KERN.

Witnesses:
 O. P. BROWNE,
 WM. H. BISHOP.